(12) United States Patent
Kassai et al.

(10) Patent No.: US 6,860,555 B2
(45) Date of Patent: Mar. 1, 2005

(54) SEAT HAMMOCK OF CHILD-CARE INSTRUMENT

(75) Inventors: Kenzou Kassai, Osaka (JP); Ichiro Ohnishi, Nara (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 10/753,096

(22) Filed: Jan. 6, 2004

(65) Prior Publication Data

US 2004/0227383 A1 Nov. 18, 2004

(30) Foreign Application Priority Data

Jan. 30, 2003 (JP) ........................................ 2003-022542

(51) Int. Cl.⁷ .......................... A47C 31/00; A47C 31/11
(52) U.S. Cl. ................................................. 297/219.12
(58) Field of Search ..................................... 297/219.12

(56) References Cited

U.S. PATENT DOCUMENTS

| | | | |
|---|---|---|---|
| 4,294,464 A | | 10/1981 | Ettridge |
| 4,568,125 A | | 2/1986 | Sckolnik |
| 5,660,435 A | * | 8/1997 | Eichhorn ............... 297/219.12 |
| 5,662,380 A | * | 9/1997 | Tam et al. ........... 297/219.12 X |
| 5,752,738 A | | 5/1998 | Onishi et al. |
| 5,918,933 A | | 7/1999 | Hutchinson et al. ... 297/219.12 |
| 5,954,404 A | * | 9/1999 | Suzuki .............. 297/219.12 X |

FOREIGN PATENT DOCUMENTS

| | | |
|---|---|---|
| JP | 8175395 | 7/1996 |
| JP | 9086417 | 3/1997 |
| WO | WO 93/21871 | 11/1993 |

* cited by examiner

Primary Examiner—Rodney B. White
(74) Attorney, Agent, or Firm—W. F. Fasse; W. G. Fasse

(57) ABSTRACT

A seat hammock for a child-care instrument includes a seat surface portion, a backrest surface portion and a pair of lower side surface portions extending to rise upward from both side edges of the seat surface portion in a used state. Each lower side surface portion has a bottom connection end connected to a side edge of the seat surface portion, a back connection end, and an upper connection end. The back connection end is provided behind and overlaps a back surface of the backrest surface portion and is connected to the back surface of the backrest surface portion at a position laterally inwardly at a distance from both side edges thereof. The upper connection end is adapted to be connected to an upward extension frame member extending upward from a rear end of a member forming a seat portion of the child-care instrument.

26 Claims, 7 Drawing Sheets

SEAT HAMMOCK OF CHILD-CARE INSTRUMENT

BACKGROUND OF THE INVENTION

1. Field of the Invention

The present invention relates to a seat hammock mounted on a body of a child-care instrument such as a baby carriage, a child safety seat, a baby chair/bed and the like, to form a seat and more particularly, it relates to a seat hammock of a child-care instrument in which an angle between a seat portion and a backrest portion can be changed.

2. Description of the Background Art

A seat hammock of a child-care instrument is made of a sewed cloth normally, and continuously forms a seat surface portion to be positioned under buttocks of a child and a backrest surface portion to be positioned behind a back of the child. When the backrest portion of the child-care instrument is reclined, the backrest surface portion of the seat hammock is inclined such that a boundary line with the seat surface portion may be a bending center. In addition, when the child-care instrument is folded and the seat portion and the backrest portion thereof approach each other, the backrest surface portion of the seat hammock is also inclined such that the boundary line with the seat surface portion may be the bending center.

FIG. 1 shows a baby carriage disclosed in Japanese Unexamined Patent Publication No. 8-175395. An illustrated baby carriage 1 can be switched between a form of a chair state and a form of a bed state and comprises a body 2 and a seat hammock 3 mounted on the body 2. A backrest portion of the baby carriage 1 can be reclined.

The body 2 of the baby carriage has a pair of handrail members 4 which is one of members constituting the seat portion, and a push rod 5 connected to a rear end of the handrail 4 and extending upward. The seat hammock 2 has a seat surface portion 6 extending almost horizontally on a seat surface forming member of the body 2, and a backrest surface portion 7 extending to rise upward from a rear edge of the seat surface portion 6.

FIG. 2 shows a baby carriage disclosed in Japanese Unexamined Patent Publication No. 9-86417. An illustrated baby carriage 10 comprises a body 11 and a seat hammock 12. The seat hammock 12 has a seat surface portion 14 extending almost horizontally on a seat forming member of the body 11, and a backrest surface portion 13 extending to rise upward from a rear edge of the seat surface portion 14. The baby carriage body 11 comprises a pair of handrails 15 and side plates 16 mounted on inner surfaces of the handrail members 15 so as to cover gaps formed under the handrails.

In the case of the baby carriage 1 shown in FIG. 1, since there are gaps above both sides of the seat surface portion 6 of the seat hammock, that is, under the handrails 4, a child seated in the seat could put a hand in the gap.

According to the baby carriage 10 shown in FIG. 2, since the side plate 16 is provided in the inner side surface of the handrail 15, the above problem can be solved to some extent. However, since the side plate 16 has to be especially provided in addition to the body 11 and the seat hammock 12 of the baby carriage, the number of parts is increased.

FIG. 3 shows an improved seat hammock 20. Similar to the above described seat hammocks, the illustrated seat hammock 20 comprises a seat surface portion 21 and a backrest surface portion 22. The backrest surface portion 22 has a pair of upper side surface portions 22a extending to rise upward from its both sides.

The seat hammock 20 shown in FIG. 3 is different from the seat hammocks 3 and 12 in that a pair of lower side surface portions 23 extending to rise upward from both side edges of the seat surface portion 21 is provided. A lower edge of each lower side surface portion 23 and a side edge of the seat surface portion 21 are sewed along a connection line 24. Furthermore, a rear edge of the lower side surface portion 23 and a front edge of the upper surface portion 22a are sewed along a connection line 25.

According to the seat hammock 20 shown in FIG. 3, since the seat hammock itself has the lower side surface portion covering gaps at both sides of the seat surface portion, the number of parts is not increased. However, the following problems arise.

That is, the seat hammock 20 is made of a soft sewed cloth. It is needless to say that the lower side surface portion 23 is also made of a soft sewed cloth. In the case of the baby carriage which can be changed between the form of the chair state and the form of the bed state, when the backrest surface portion 22 is reclined at the maximum to become the bed state, the lower side surface portion 23 extends flatways in a state there is no wrinkle. Therefore, when the backrest portion of the baby carriage is raised to form the chair state, the soft lower side surface portion 23 is bent inwardly in wedges, which could cause the child to feel uncomfortable. Alternatively, the soft lower side surface portion 23 could protrude outward or form wrinkles, which could interfere with a frame of the baby carriage body.

In order to provide stiffness in the lower side surface portion 23, it is considered to mount a core in the lower side surface portion 23. In this case, when the backrest portion is raised, the lower side surface portion 23 is prevented from protruding outwardly because of the frame of the baby carriage body to some extent, but it cannot be prevented from bending inwardly. Therefore, in the sate of the chair, a gap is formed between the lower side surface portion 23 and a side surface forming member of the baby carriage body, which is not preferable in view of safety.

SUMMARY OF THE INVENTION

It is an object of the present invention to provide a seat hammock in which a gap is not formed between it and a seat portion side surface forming member of a child-care instrument body to enhance safety, without increasing the number of parts.

A seat hammock according to the present invention is mounted on a child-care instrument in which an angle between a seat portion and a backrest portion can be changed, to form a seat. Here, a fact that the angle between the seat portion and the backrest portion can be changed includes a case where the backrest portion is reclined. As another case, even in a case of a child-care instrument in which the backrest portion is not reclined, the above fact includes a case where the seat portion and the backrest portion approach each other at the time of a folding operation.

A seat hammock comprises a seat surface portion, a backrest surface portion, and lower side surface portions. The backrest surface portion extends to rise upward from a rear edge of the seat surface portion in a used state. The lower side surface portions extend to rise upward from both side edges of the seat surface portion in the used state. Each lower side surface portion has a bottom connection end connected to a side edge of the seat surface portion, and upper connection end connected to an upward extension frame member extending upward from a rear end of a member forming the seat portion of the child-care instrument.

According to the above constitution, the position of the bottom connection end and the position of the upper connection end of the lower side surface portion are always constant and not moved in the state the baby carriage is used. More specifically, even when the backrest portion of the child-care instrument is reclined, a triangle formed by a front position (first fixed point) of the bottom connection end of the lower side surface portion, a rear position (second fixed point) of the bottom connection end of the lower side surface portion, and a position (third fixed point) of the upper connection end of the lower side surface portion is not moved. As a result, a plane state of the lower side surface portion can be stably maintained and there is no gap formed between the lower side surface portion and the seat portion side surface forming member of the child-care instrument body.

According to one embodiment, the lower side surface portion has a back connection end provided behind a back surface of the backrest surface portion so as to overlap with it and connected to the back surface of the backrest surface portion at a position inside of the backrest surface portion at a distance from both side edges thereof. Thus, since the back connection end of the lower side surface portion is provided behind the back surface of the backrest surface portion so as to overlap with it, the forward movement of the backrest surface portion will not influence on the plane state of the lower side surface portion maintained by the above three fixed points.

According to one embodiment, the backrest surface portion includes a pair of upper side surface portions extending to rise upward from both sides in a used state. In this case, the back connection end of the lower side surface portion is provided behind a back surface of the upper side surface portion so as to overlap with it.

The lower side surface portion includes a rigid core, for example. When the core is provided, the plane state of the lower side surface portion can be further stably maintained. In addition, when the child-care instrument is folded down, the movement of the lower side surface portion can be constant and stable because of the core. Normally, since the body part of the child-care instrument exists outside of the lower side surface portion of the seat hammock, as the upward extension frame member of the body and the seat portion forming member approach each other in accordance with the folding operation of the child-care instrument, the lower side surface portion with core is folded down inwardly.

When the child-care instrument comprises a handrail member, the upper connection end of the lower side surface portion is connected to a member connected to a rear end of the handrail member of the child-care instrument and extending upward, for example.

The upper connection end of the lower side surface portion may be directly or indirectly connected to the upward extension frame member of the child-care instrument body. As an example of the indirect connection, for example, the upper connection end of the lower side surface portion of the seat hammock is connected to the upper side surface portion and the upper side surface portion is connected to the upward extension frame member.

A reclining angle of the backrest surface portion of the child-care instrument can be changed, for example. Besides, the child-care instrument is folded so that the backrest surface portion and the seat portion approach each other, for example. As the child-care instrument, there are a baby carriage, a child safety seat, a baby chair/bed and the like.

DESCRIPTION OF THE PREFERRED EMBODIMENT

An embodiment of the present invention is described with reference to FIGS. 4 to 8.

Figure 6:
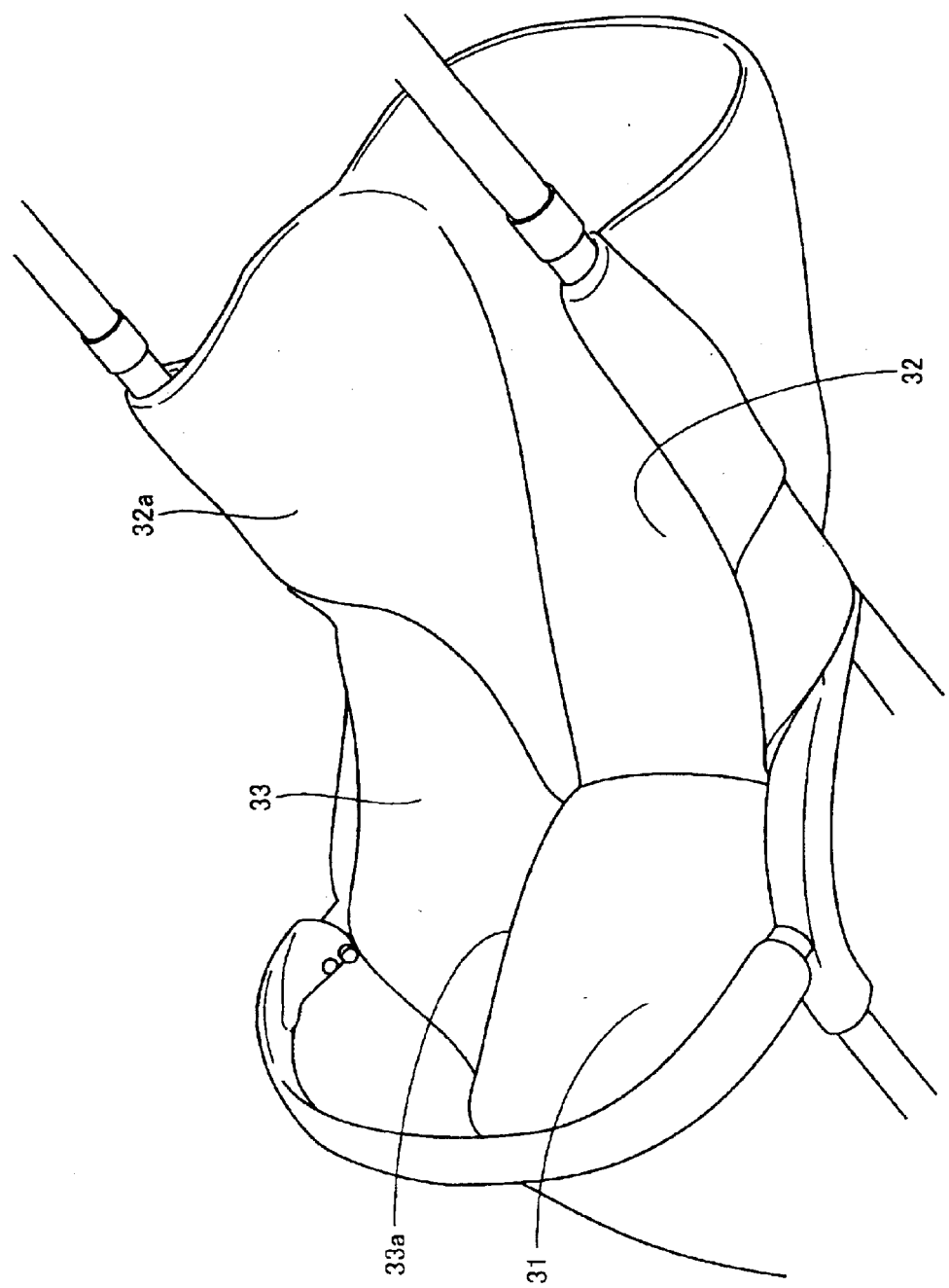
FIG. 6 is a perspective view showing a used state of the seat hammock shown in FIG. 4.
Figure 7:
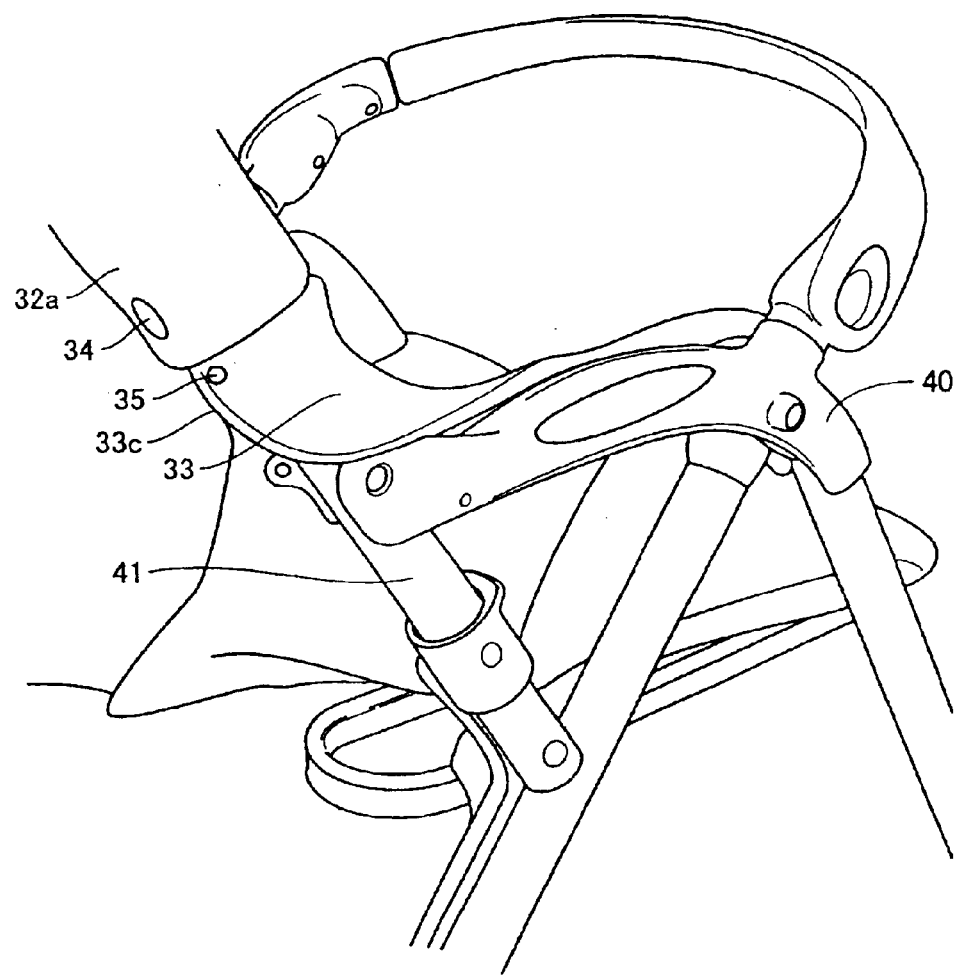
FIG. 7 is a perspective view showing the part shown in FIG. 6 which is viewed from the rear side direction.

An illustrated seat hammock 30 is made of a sewed cloth and mounted on a baby carriage to form a seat. FIGS. 6 and 7 show a part of a body of the baby carriage. The baby carriage comprises a backrest portion which can be reclined and takes a form of a bed state when the backrest portion is reclined at the maximum. In addition, the baby carriage is folded down so that the backrest portion and a seat portion may approach each other.

Figure 1:
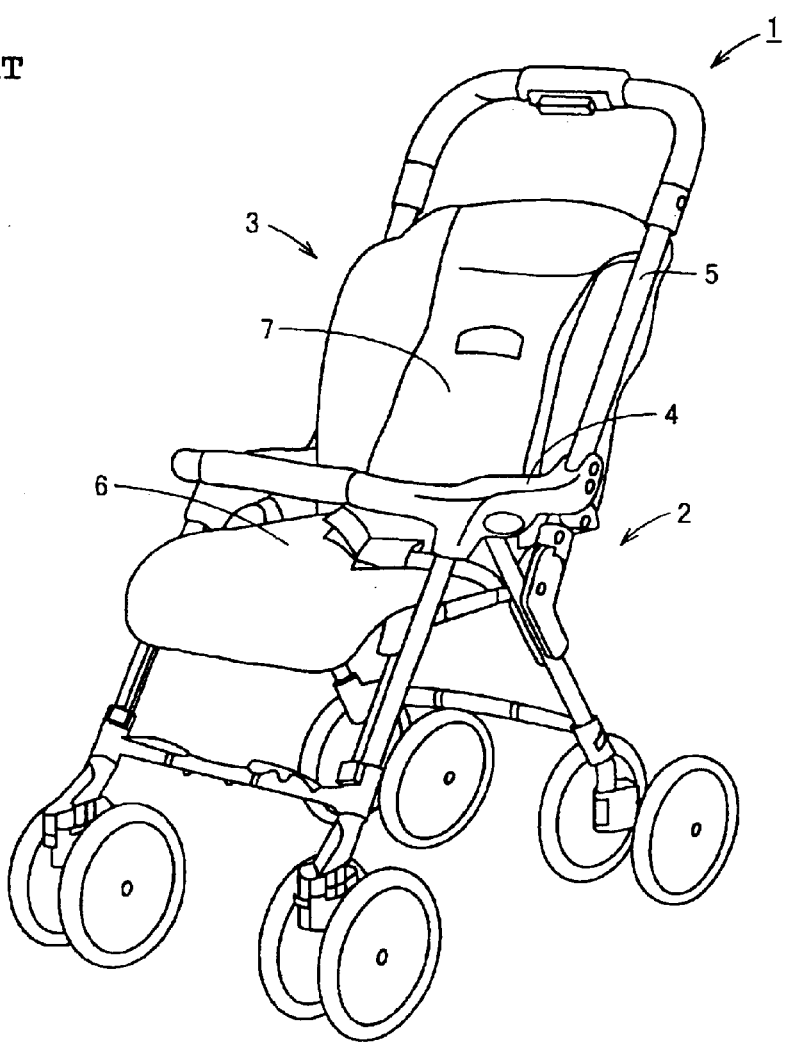
FIG. 1 is a perspective view showing a baby carriage disclosed in Japanese Unexamined Patent Publication No. 8-175395.
Figure 2:
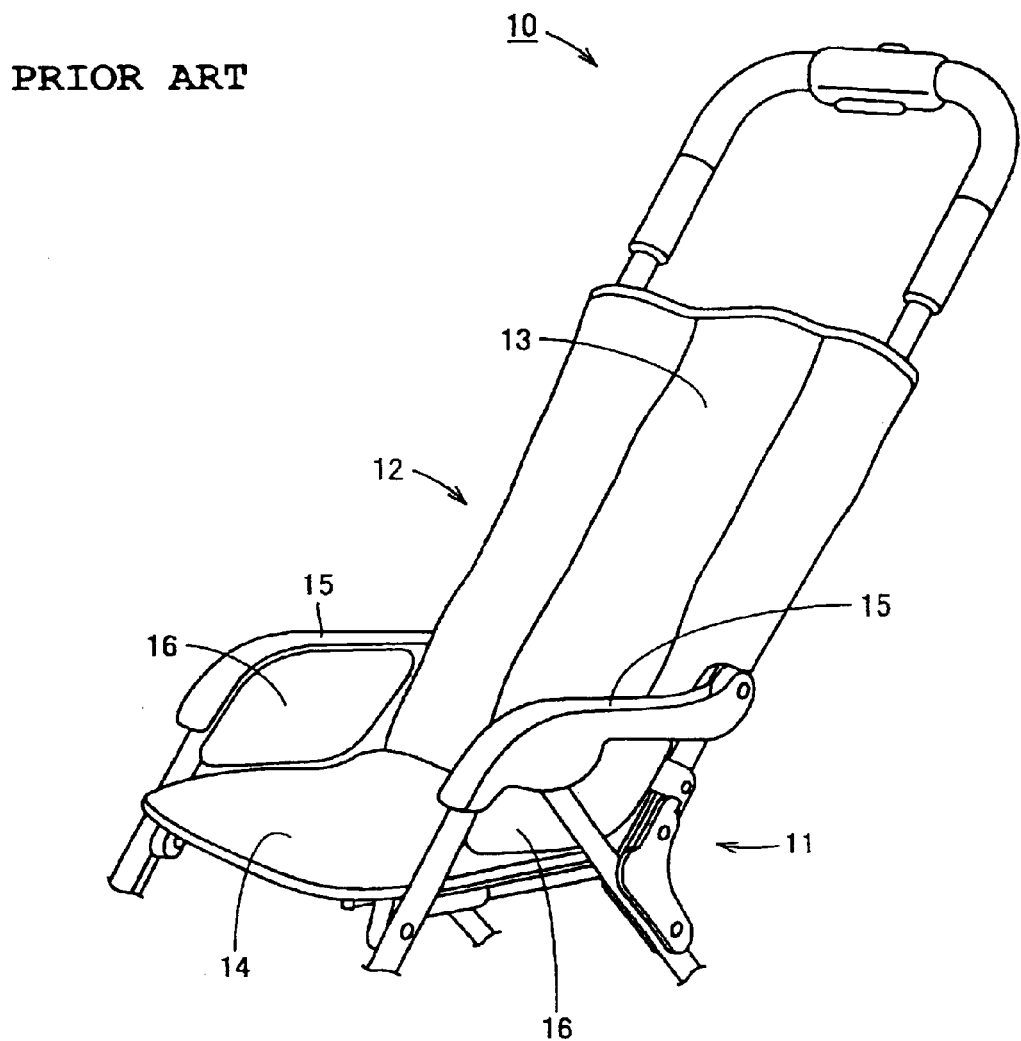
FIG. 2 is a perspective view showing a baby carriage disclosed in Japanese Unexamined Patent Publication No. 9-86417.
Figure 3:
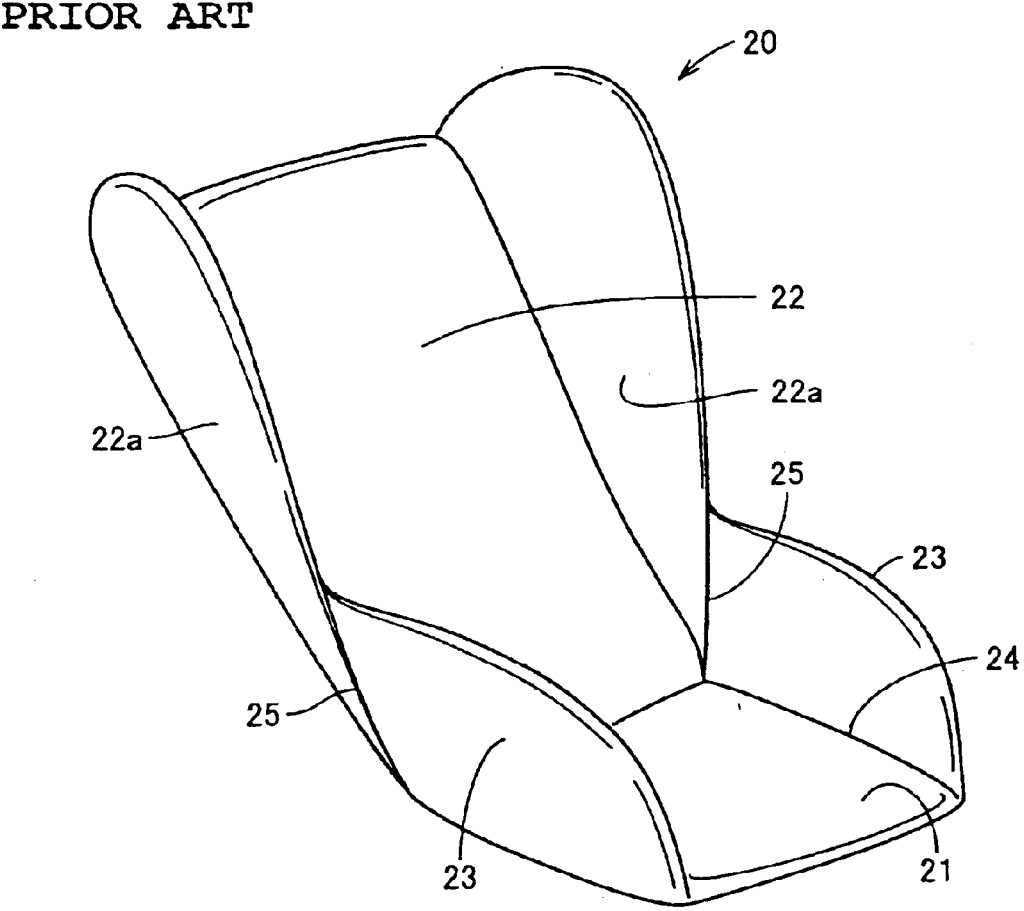
FIG. 3 is a perspective view showing an example of a seat hammock having a lower side surface portion.
Figure 4:
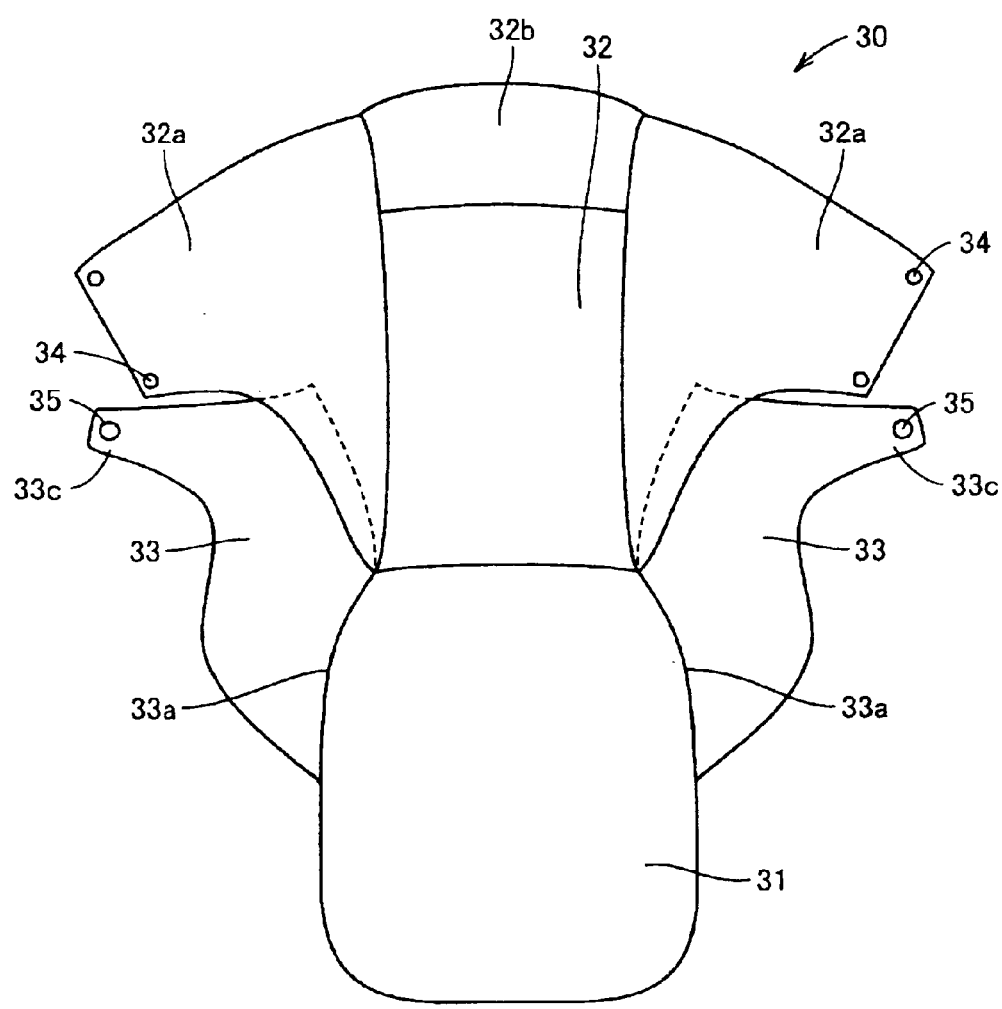
FIG. 4 is a front view showing an embodiment of the present invention.
Figure 5:
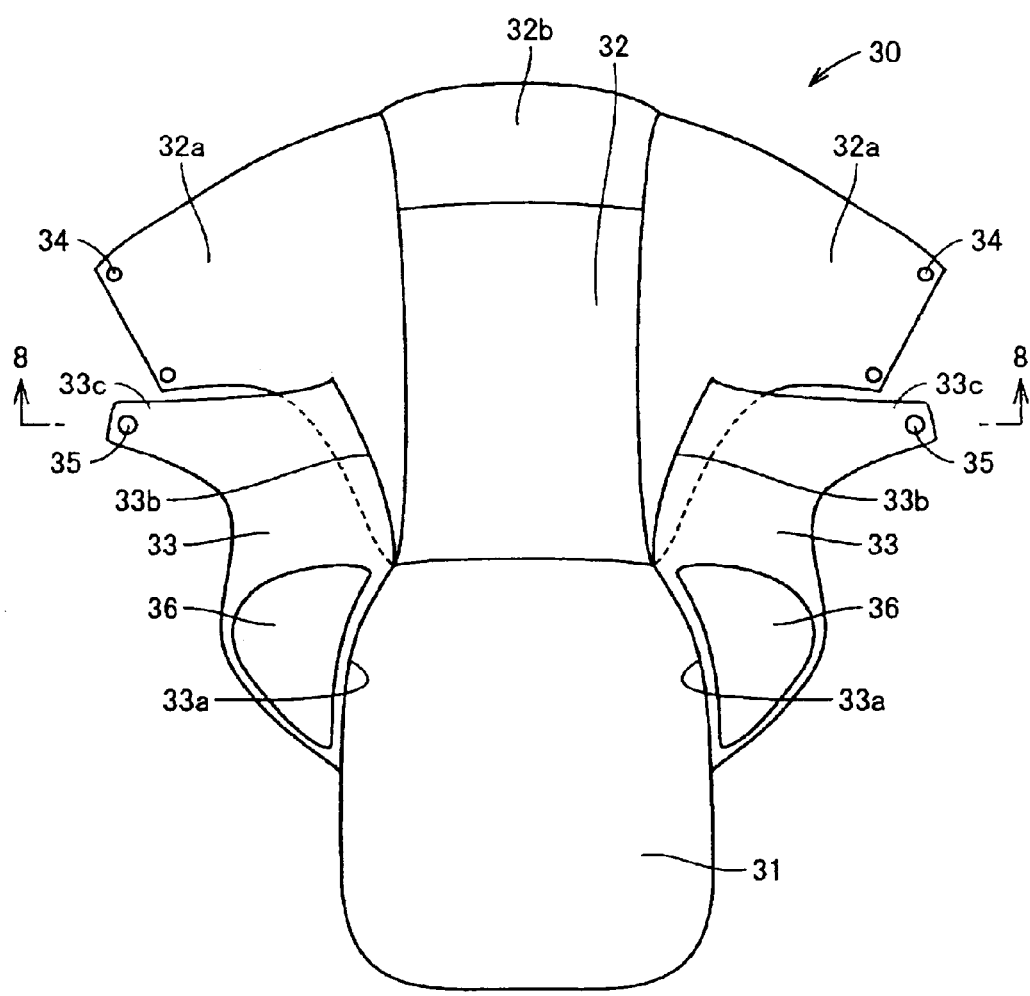
FIG. 5 is a back view showing the seat hammock shown in FIG. 4.

As shown in FIGS. 4 and 5, the seat hammock 30 comprises a seat surface portion 31 to be positioned under buttocks of a child, a backrest surface portion 32 to be positioned behind a back of the child, and a pair of lower side surface portions 33. The backrest surface portion 32 rises upward from a rear edge of the seat surface portion 31 when the baby carriage is used in a form of a chair state. The pair of lower side surface portions 33 extend to rise upward from both side edges of the seat surface portion 31. According to an exploded state of the seat hammock 30 shown in FIGS. 4 and 5, the seat surface portion 31, the backrest surface portion 32 and the pair of lower side surface portions 33 extend on a plane.

The backrest surface portion 32 comprises a pair of upper side surface portions 32a extending to rise upward from its both sides, and a head guard surface portion 32b extending to rise upward from its upper edge when the baby carriage is used in the form of the bed state, especially. A set button 34 is mounted on a side end portion of each upper side surface portion 32a.

Figure 8:
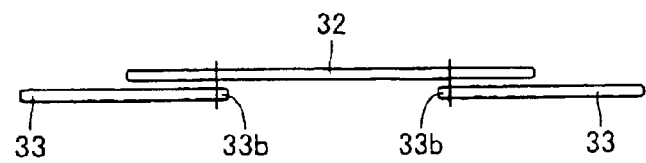
FIG. 8 is a schematic sectional view taken along line 8—8 in FIG. 5.

Each lower side surface portion 33 of the seat hammock 30 comprises a bottom connection end 33a connected to a side edge of the seat surface portion 31, a back connection end 33b provided behind a back surface of the backrest surface portion 32 so as to overlap with it and connected to the back surface of the backrest surface portion 32 at a position inside of the backrest surface portion 32 at a distance from both side edges thereof, and an upper connection end 33c. A set button 35 is mounted on an end portion of the upper connection end 33c. FIG. 8 is a schematic sectional view taken along line 8—8 in FIG. 5, in which positions of the back connection ends 33b of the pair of lower side surface portions 33 are clearly shown.

As can be clear from FIG. 5, a rigid core 36 is mounted on a back surface of each lower side surface portion 33.

As shown in FIG. 7, the body of the baby carriage has a pair of handrail members 40 as one of members constituting the seat portion. An upward extension frame member 41 extending in the vertical direction is connected to a rear end of each handrail member 40. In the illustrated embodiment, the upward extension frame member 41 forms a push rod of the baby carriage. In a case of a baby carriage which can be changed in position so as to be pushed from behind and pushed face-to-face, the upward extension frame member 41 and the push rod are separately provided.

As can be clear from FIGS. 6 and 7, the upper side surface portion 32a of the seat hammock 30 is wrapped around the upward extension frame member 41 of the baby carriage to be fixed thereto. The set button 34 of the upper side surface portion 32a engages with a receiver clip fixed to the upward extension frame member 41.

Furthermore, the upper connection end 33c of the lower side surface portion 33 of the seat hammock 30 is also wrapped around the upward extension frame member 41 to be fixed thereto. The set button 35 of the upper connection end 33c engages with a receiver clip fixed to the upward extension frame member 41.

Even when the backrest portion of the baby carriage body is reclined, positions of the body structure members of the handrail member 40, the upward extension frame member 41 and a seat surface supporting member are not changed. Therefore, the positions of the bottom connection end 33a and the position of the upper connection end 33c of the lower side surface portion 33 are always constant and not moved in the state the baby carriage is used. In other words, a triangle formed by a front position (first fixed point) of the bottom connection end 33a of the lower side surface portion, a rear position (second fixed point) of the bottom connection end 33a of the lower side surface portion 33, and a position (third fixed point) of the upper connection end 33c of the lower side surface portion 33 is not moved. As a result, a plane state of the lower side surface portion 33 can be stably maintained when the baby carriage is used in the state of the chair, it is used in the state of the bed, and the backrest portion is reclined.

Since each lower side surface portion 33 has the core 36, the plane state of the lower side surface portion 33 can be further stabilized. As shown in FIGS. 6 and 7, according to the illustrated embodiment, since there is no space between a seat portion side surface forming member of the baby carriage body and the lower side surface portion 33 of the seat hammock 30, it is superior in view of safety. Since the back connection end 33b of the lower side surface portion 33 is provided behind the back surface of the backrest surface portion 32 so as to overlap with it, even when the backrest surface portion 32 is moved forward in accordance with the reclining operation, the plane state of the lower side surface portion 33 maintained by the above three points is not influenced.

In the case of the baby carriage shown in FIGS. 6 and 7, as the baby carriage is folded down, a front portion of the seat surface and the upward extension frame member 41 approach each other. More specifically, in FIG. 7, the front portion of the seat surface moves counterclockwise and the upward extension frame member 41 is turned around clockwise. Since the upward extension frame member 41, rear legs having rear wheels and the like exist outside of the lower side surface portion 33 having the core 36, the lower side surface portion 33 is folded inwardly in accordance with the folding operation of the baby carriage.

Although one embodiment of the present invention was described with reference to the drawings, the above described and illustrated embodiment only shows the present invention illustratively. Therefore, various kinds of modifications and variations can be added within the same scope or an equivalent scope as in the present invention. Some of them are illustratively listed and described hereinafter.

(1) According to the illustrated embodiment, the upper connection end 33c of the lower side surface portion 33 was directly mounted on the upward extension frame member 41 of the baby carriage body. As its variation, the upper connection end of the lower side surface portion 33 may be indirectly mounted on the upward extension frame member 41. For example, the upper connection end of the lower side surface portion may be connected to the upper side surface portion and the upper side surface portion may be connected to the upward extension frame member. In this case also, the position of the upper connection end of the lower side surface portion is constant and not moved while the baby carriage is used.

(2) Although the backrest surface portion of the seat hammock has the upper side surface portion in the illustrated embodiment, the backrest surface portion may not have the upper side surface portion.

(3) The core of the lower side surface portion may be omitted.

(4) As the child-care instrument, other than the baby carriage, a child safety seat, a baby chair/bed and the like can be employed. In other words, the present invention can be applied to the child-care instrument in which an angle between the seat portion and the backrest portion can be changed.

What is claimed is:

1. A seat hammock for a child-care instrument adapted to be mounted on the child-care instrument in which an angle between a seat portion and a backrest portion can be changed, to form a seat, comprising:
   a seat surface portion,
   a backrest surface portion extending to rise upward from a rear edge of said seat surface portion in a used state; and
   a pair of lower side surface portions extending to rise upward from both side edges of said seat surface portion in the used state, wherein
   each said lower side surface portion has a bottom connection end connected to a respective one of said side edges of said seat surface portion, and an upper connection end adapted to be connected to an upward extension frame member extending upward from a rear end of a member forming the seat portion of the child-care instrument, and
   each said lower side surface portion has a back connection end that is provided behind and overlaps a back surface of said backrest surface portion and is connected to the back surface of the backrest surface portion at a position laterally inwardly at a distance from both side edges thereof.

2. The seat hammock for the child-care instrument according to claim 1, wherein said backrest surface portion includes a pair of upper side surface portions extending to rise upward at both sides thereof in the used state, and said back connection end of said lower side surface portion is provided behind and overlaps said back surface of said upper side surface portion of said backrest surface portion.

3. The seat hammock for the child-care instrument according to claim 1, wherein said lower side surface portion includes a rigid core.

4. The seat hammock for the child-care instrument according to claim 1, wherein said upper connection end of said lower side surface portion is adapted to be connected to a member connected to and extending upward from a rear end of a handrail member of the child-care instrument.

5. The seat hammock for the child-care instrument according to claim 1, wherein said backrest surface portion includes a pair of upper side surface portions extending to rise upward at both sides thereof in the used state,
   said upper connection end of said lower side surface portion is connected to said upper side surface portion, and
   said upper side surface portion is adapted to be connected to the upward extension frame member extending upward from the rear end of the member forming the seat portion of the child-care instrument.

6. The seat hammock for the child-care instrument according to claim 1, wherein a reclining angle of said backrest surface portion of said seat hammock can be changed.

7. The seat hammock for the child-care instrument according to claim 1, wherein said child-care instrument can be folded so that said backrest surface portion and said seat surface portion of said seat hammock approach each other.

8. The seat hammock for the child-care instrument according to claim 1, wherein the child-care instrument is a baby carriage.

9. A combination of the seat hammock according to claim 1 with the child-care instrument.

10. A child-care instrument comprising a frame and a child support hammock mounted on said frame, wherein:
    said frame includes a frame seat arrangement and a frame backrest arrangement extending rearward and upwardly from said frame seat arrangement;
    said frame backrest arrangement includes two frame members extending rearward and upwardly from a rear end of said frame seat arrangement respectively at two sides of said frame;
    said hammock is adapted to support a child seated or reclining therein;
    said hammock includes a hammock seat, a hammock backrest connected to and extending rearward and upwardly from a rear edge of said hammock seat, and two hammock seat side panels, respectively connected to and extending upwardly from two opposite side edges of said hammock seat;
    said hammock seat side panels respectively have side panel upper end that are respectively connected to and supported from said frame members of said frame backrest arrangement, either directly or indirectly; and
    said hammock seat side panels respectively have side panel rear portions that respectively extend behind and overlap a rear surface of said hammock backrest, and that are respectively connected to said rear surface of said hammock backrest at respective positions laterally inwardly spaced from respective opposite side edges of said hammock backrest.

11. The child-care instrument according to claim 10, wherein said side panel upper ends are directly connected to and supported from said frame members of said frame backrest arrangement.

12. The child-care instrument according to claim 11, wherein said frame members are equipped with receiver clips and said side panel upper ends are equipped with button fasteners that are securable to said receiver clips, by which said side panel upper ends are connected to said frame members.

13. The child-care instrument according to claim 11, wherein said side panel upper ends respectively extend forwardly along lateral inner sides of said frame members, thence laterally outwardly along front sides of said frame members, and thence rearward along lateral outer sides of said frame members, to be thereby partly wrapped around said frame members.

14. The child-care instrument according to claim 10, wherein said side panel upper ends are connected to said hammock backrest, which is connected to said frame members of said frame backrest arrangement, whereby said side panel upper ends are indirectly connected to and supported from said frame members.

15. The child-care instrument according to claim 14, wherein said hammock backrest includes a central backrest body and two backrest side panels respectively extending from two opposite side edges of said central backrest body, and said side panel upper ends are respectively connected to said backrest side panels.

16. The child-care instrument according to claim 10, wherein said hammock backrest includes a central backrest body and two backrest side panels respectively extending upwardly and forwardly from two opposite side edges of said central backrest body, and said side panel rear portions of said hammock seat side panels respectively extend behind and overlap said rear surface of said backrest side panels of said hammock backrest.

17. The child-care instrument according to claim 16, wherein said backrest side panels respectively have distal ends extending away from said central backrest body, and said distal ends are connected to and supported from said frame members of said frame backrest arrangement.

18. The child-care instrument according to claim 17, wherein said frame members are equipped with receiver clips and said distal ends of said backrest side panels are equipped with button fasteners that are securable to said receiver clips, by which said distal ends of said backrest side panels are connected to said frame members.

19. The child-care instrument according to claim 17, wherein said distal ends of said backrest side panels respectively extend forwardly along lateral inner sides of said frame members, thence laterally outwardly along front sides of said frame members, and thence rearward along lateral outer sides of said frame members, to be thereby partly wrapped around said frame members.

20. The child-care instrument according to claim 10, wherein said hammock seat side panels each respectively include a cloth panel and a rigid core.

21. The child-care instrument according to claim 10, wherein said hammock seat, said hammock backrest and said hammock seat side panels respectively comprise cloth members that are sewn together with one another.

22. The child-care instrument according to claim 10, wherein said frame seat arrangement includes two handrail members extending forwardly and rearward respectively at said two sides of said frame, and said frame members of said frame backrest arrangement are respectively connected to and extend upwardly and rearward from rear ends of said handrail members.

23. The child-care instrument according to claim 10, wherein said frame backrest arrangement includes at least a frame backrest portion of which a reclining angle relative to said frame seat arrangement can be varied.

24. The child-care instrument according to claim 23, wherein an angular position of said frame members relative to said frame seat arrangement does not vary as said reclining angle of said frame backrest portion is varied.

25. The child-care instrument according to claim 10, wherein said child-care instrument can be folded so that said frame backrest arrangement and said frame seat arrangement approach one another.

26. The child-care instrument according to claim 10, being a baby carriage or stroller.

* * * * *

UNITED STATES PATENT AND TRADEMARK OFFICE
CERTIFICATE OF CORRECTION

PATENT NO. : 6,860,555 B2
DATED : March 1, 2005
INVENTOR(S) : Kassai et al.

It is certified that error appears in the above-identified patent and that said Letters Patent is hereby corrected as shown below:

Column 7,
Line 48, after "upper", replace "end" by -- ends --;

Column 8,
Line 43, after "thence", replace "rearward" by -- rearwardly --;
Line 58, after "upwardly and", replace "rearward" by -- rearwardly --.

Signed and Sealed this

Fifth Day of July, 2005

JON W. DUDAS
*Director of the United States Patent and Trademark Office*